United States Patent

Ichiba et al.

[11] 3,826,862
[45] July 30, 1974

[54] LAMINATE TAPE AND LAMINATE SHEATHED CABLE HAVING AN ETHYLENE/GLYCIDYL COPOLYMER ADHESIVE

[75] Inventors: Terumichi Ichiba; Hiroshi Shimba; Hiroaki Mukunashi, all of Yokohama, Japan

[73] Assignee: Sumitomo Electric Industries Ltd., Osaka, Japan

[22] Filed: May 14, 1973

[21] Appl. No.: 360,248

[30] Foreign Application Priority Data
May 13, 1972   Japan.............................. 47-47333
May 13, 1972   Japan.............................. 47-47335
May 27, 1972   Japan.............................. 47-52601
May 27, 1972   Japan.............................. 47-52602

[52] U.S. Cl............... 174/102 R, 161/216, 174/36, 174/107, 174/110 PM
[51] Int. Cl. ........................................... H01b 7/18
[58] Field of Search .. 161/218, 216; 174/36, 102 R, 174/107, 110 PM, 110 R, 117 A

[56] References Cited
UNITED STATES PATENTS
3,383,372   5/1968   Spivey........................... 161/218 X
3,681,515   8/1972   Mildner............................. 174/107

OTHER PUBLICATIONS
Insulation of Circuits, Directory/Encyclopedia, June/-July 1971, p. 122, 124.

Primary Examiner—A. T. Grimley
Attorney, Agent, or Firm—Sughrue, Rothwell, Mion, Zinn & Macpeak

[57] ABSTRACT

A binary copolymer having a melt index of 16g/10 min or less measured at a temperature of 190°C under a load of 2,160 g consisting of (a) ethylene; and (b) a comonomer selected from glycidyl methacrylate, glycidyl acrylate and allyl-glycidyl ether; or a mixed composition comprising (a') as a first component, one or more of the above mentioned binary copolymers; and (b') as a second component, one or more other copolymers consisting of (a'') ethylene; and (b'') a comonomer selected from an alkyl acrylate, an alkyl methacrylate and vinyl acetate, is coated on one or both surfaces of a metal tape to make a laminate tape. The laminate tape is used for preparing a laminate sheathed cable. The laminating resin may contain an antioxidant.

10 Claims, 2 Drawing Figures

LAMINATE TAPE AND LAMINATE SHEATHED CABLE HAVING AN ETHYLENE/GLYCIDYL COPOLYMER ADHESIVE

BACKGROUND OF THE INVENTION

1. FIELD OF THE INVENTION

Laminate sheathed cables are prepared by applying or winding a laminate tape which consists of a metal tape with a resin coated on one or both surfaces of the metal, around a cable core, and then coating a protective plastic on the laminate tape.

The present invention relates to a laminate tape and a laminate sheathed cable, and, more particularly, to a laminate tape consisting of a metal tape and a laminating resin coated on one or both surfaces of the metal tape, the laminating resin having a good adhesive property so as to be firmly adhered not only to the metal tape but also to the polyethylene of a jacket layer. The present invention also relates to a laminate sheathed cable prepared by applying or winding the laminate tape around a cable core and then coating a plastic jacket layer on the laminate tape.

2. DESCRIPTION OF THE PRIOR ART

Resins which are used as a coating layer for preparing laminate sheathed cables must have various characteristics, such as an adhesive capability to adhere not only to a metal tape but also to a jacketing compound, for example, polyethylene, and workability in the manufacture of a cable, for example, abrasion resistance in a tape forming apparatus, and the like.

The reason for the necessity of good adhesion of the resin to the metal tape and the polyethylene of the jacket layer is that contraction of the sheath is to be suppressed by the aluminum by improving not only the moisture resistance (that is, prevention of moisture permeation from the outside) but also the mechanical strength (that is, bending strength and the like) of the laminated or united sheath (or protective layer). This is particularly necessary because a plastic sheath, in general, has an inner strain generated therein in the extrusion thereof, and thus is contracted due to the heat cycle of an outer air.

As resins for laminates, polyethylene has been used, e.g., see British Pat. No. 886,417. However, conventional polyethylene resins are defective in that the adhesive strength to the aluminum tape is weak.

U.S. Pat. No. 3,233,036 discloses an improved resin which is free from the drawback of low adhesive strength to aluminum tape, where a resin containing a carboxyl group is to improve the adhesive strength to the aluminum tape. However, this prior art also is defective in that sufficient adhesive strength cannot be obtained due to the great difference of polarity between the resin and the polyethylene of the protective jacket layer.

U.S. Pat. No. 3,586,756 discloses an improvement which is free from the two defects above mentioned which provides a laminate tape of the so-called two-layer or multi-layer type wherein an ethylene copolymer containing a carboxyl group (which forms a chemical bond with a metal) is coated on one surface in contact with a metal tape (for example, an aluminum tape) and a resin which does not bind as strongly with the metal tape as the copolymer does but which adheres to the jacket layer more firmly than the copolymer, is applied to the other surface which is not in contact with the metal tape.

Regarding the above described three kinds of laminate tapes, some properties of a known laminate sheathed cable having a structure as shown in the FIG. 1 were observed, and the results are shown in Table 1. With reference to FIG. 1, which shows a crosscut section of a known laminate sheathed cable where a laminate tape consisting of a metal tape and a resin coated on one surface of the metal is used, 1 is a cable core, 4 is a laminate tape layer consisting of a metal tape 2 and a resin layer 3 laminated on the tape 2, and 5 is a jacket layer of synthetic resin.

The laminate tape used in the laminate sheathed cable whose properties were tested in the experiments which generated the data of Table 1 consists of a soft aluminum 0.2 mm thick and a laminating resin layer 0.05 mm thick.

TABLE 1

| Resin *(1) | Adhesive strength between aluminum tape and polyethylene jacket layer (Kg/cm) *(2) | Bending repetition (up to formation of cracks in the aluminum) *(3) | Remarks |
|---|---|---|---|
| P | 0.95 (a) | 10–15 | (a) Peeling between 18aluminum and laminating resin. |
| S | 1.55 (b) | 20–25 | (b) Peeling between 18polyethylene jacket and laminating resin. |
| E-S | 3.05 (c) | 30–35 | (c) Cohesive failure 18between aluminum and polyethylene jacket. |

*(1) P: laminating polyethylene (trade name: Sumikathene F-701)
S: metal salt of ethylene-acrylic acid copolymer (trade name: Surlyn A)
E-S: two-layer laminate consisting of the above S laminated on the surface of aluminum and an ethylene-vinyl acetate copolymer (trade name: Evatate D-2011) further laminated on the S.

*(2) A strip of 100 mm width was cut from the cable sheath, and a peeling test at straight angles was carried out on the strip, at a separating speed of 100 mm/min.

*(3) bending test: The bending strength was tested according to the mandrel test method where a mandrel of a diameter 12 times that of the cable to be tested was used and bending at a straight angle was repeated. One repeated bending was counted as one time, and the number of repeated bendings are given in Table 1.

As is seen in Table 1, the laminate sheathed cable with the two-layer laminate tape (E-S) has excellent properties. However, when this kind of laminate tape is used, although the mechanical properties of the resulting cable are excellent, various faults are encountered in the preparation of such laminate tapes, such as, the manufacturing steps are complicated, the manufacturing cost is high and that the cost of the resulting cables is high. This is due to the fact that the prepared laminate tapes are composed of two layers or multiple layers.

U.S. Pat. No. 3,586,756 teaches a method of preparing a one-layer laminate tape having properties similar to those of the above mentioned two-layer laminate tape, where an adhesive layer is laminated on a metal tape in such manner that the reactive groups of the laminated adhesive layer are concentrated in the vicinity of the metal tape while the concentration of the reactive groups is gradually lowered with the distance from the surface of the metal, the surface of the laminated layer being made of a resin which adheres to polyethylene in the cable jacket but which does not adhere to the metal.

The manufacturing method of such a one-layer laminate tape is, for example, as follows: a polyethylene tape is prepared before lamination, and after only one surface of the polyethylene tape is chemically treated to form a layer containing reactive groups on the surface, the chemically treated surface is adhered to the surface of the metal and heat-sealed. However, this kind of laminate tape is subject to the faults that the manufacture thereof is difficult and the tape is not economical.

SUMMARY OF THE INVENTION

The inventors have discovered a method of economically preparing a laminate sheathed cable having excellent mechanical properties using a one-layer laminate tape composed of a resin composition which adheres to a metal layer and to a protective polyethylene, and which is free from any complicated steps in the manufacture of the laminate tape.

Accordingly, the object of the present invention is to provide a laminate tape and a laminate sheathed cable where a binary copolymer of ethylene-glycidyl methacrylate, ethylene-glycidyl acrylate or ethylene-allyl glycidyl ether is used as a laminating material.

Another object of the present invention is to use as the laminating material a mixed composition consisting of (i) as a first component, one or more binary copolymers from ethylene-glycidyl methacrylate, ethylene-glycidyl acrylate or ethylene-allyl glycidyl ether, and (ii) as a second component, one or more copolymers from ethylene-alkyl acrylate, ethylene-alkyl methacrylate or ethylene-vinyl acetate.

Still another object of the present invention is to provide a resin composition of improved heat stability which consists of the above mentioned resin and 100–10,000 ppm of an antioxidant.

DETAILED DESCRIPTION OF THE INVENTION

Figure 1:
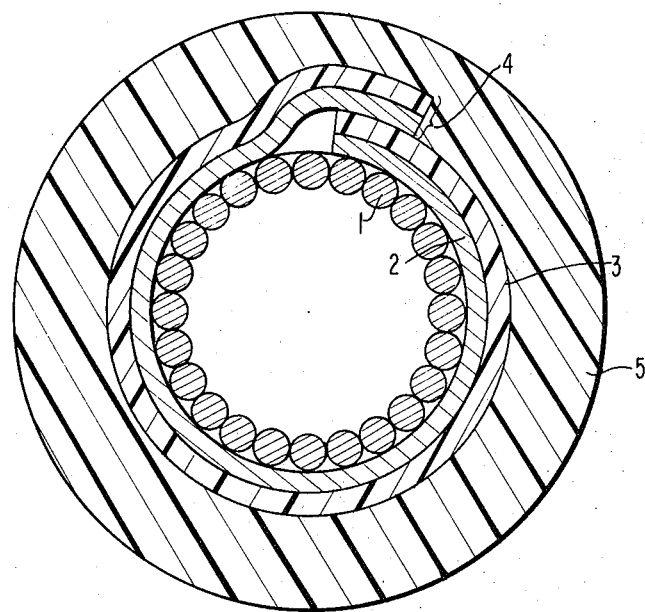
FIG. 1 shows a cross section of a known laminate sheathed cable where a laminate tape consisting of a metal tape and a resin coated on one surface of the metal is used.

The reason why the properties of the resulting laminate sheathed cable of the present invention as described above are improved by using a mixture of the first component and the second component is that the adhesive strength between the laminating resin layer and the metal can be improved due to the high adhesiveness resulting from the reaction of the epoxy group(s) in the first component and the metal and there is a close contact between the resin layer and the surface of the metal resulting from the existence of the second component, and the adhesiveness between the protective polyethylene of the laminate sheathed cable and the laminating resin layer is improved due to the existence of the said second component which is compatible with the polyethylene.

The above described first component copolymers can be prepared by various methods. One method for their preparation is to polymerize a mixture of ethylene and another component in the presence of a free radical catalyst under the polymerization conditions of 40–5,000 Kg/cm$^2$ and 40–300°C. Another method is to add, in the polymerization step, a chain transfer agent such as ethane, propane, propylene or the like, to prepare the copolymers.

The reason why the antioxidant is added to the resins is that the ease of processing the resins in a high-temperature and high-speed extrusion operation at extrusion temperatures of about 265°C or more is increased, the adhesive strength between the metal and the resin layer is improved and a resin layer of uniform thickness can be obtained.

The present invention will now be explained in more detail by the following examples.

EXAMPLE 1

Various specimens of laminate tapes were prepared by means of a lamination method where the binary copolymers of the present invention described above and mixtures of the above described first component and second component of the present invention were used without any antioxidant. The adhesive strength between the metal and the laminated resin and between the resin and the protective plastic layer were tested in each specimen. The results are shown in Table 2. For reference, some conventional laminating resins were also tested and the results are also shown in Table 2.

In Table 3, the components of the respective resins used in these experiments and the characteristics thereof (melt index) are given.

In these experiments, aluminum, which is most widely and generally used in the Cable industry, was used as the metal, and polyethylene was used as the protective plastic or sheathing layer.

TABLE 2

Adhesiveness of Resin (without antioxidant)

| Resin | Adhesive strength between metal and laminat-resin of laminate tape *(1) (g/cm) low-temperature lamination | Adhesive strength between polyethylene and metal via laminating Resin *(2) (g/cm) | Adhesive strength between metal and laminating resin of laminate tape *(3) (g/cm) high-temperature lamination |
|---|---|---|---|
| reference P | 50 | 320 | — |
| S | 1055 | 0 | — |
| E-S | 520 | 2500 | — |
| *(4) single component E$_1$ | 430 | 2420 | 411 |
| E$_2$ | 490 | 2540 | 408 |
| E$_3$ | 465 | 2600 | 422 |
| E$_4$ | 460 | 2610 | 415 |
| E$_5$ | 475 | 2700 | 414 |
| E$_6$ | 530 | 2450 | 427 |
| F$_1$ | 505 | 2800 | 401 |
| G$_1$ | 440 | 2750 | 405 |
| G$_2$ | 470 | 2700 | 398 |
| mixture E$_1$A$_1$ *(5) | | | |

TABLE 2 — Continued

| Resin | | Adhesive strength between metal and laminate-resin of laminate tape *(1) (g/cm) low-temperature lamination | Adhesive strength between polyethylene and metal via laminating Resin *(2) (g/cm) | Adhesive strength between metal and laminating resin of laminate tape *(3) (g/cm) high-temperature lamination |
|---|---|---|---|---|
| | =50/50 | 454 | 3000 or more | 400 |
| | =95/5 | 480 | do. | 432 |
| $E_1/B_1$ | =30/70 | 448 | do. | 399 |
| | =60/40 | 475 | do. | 419 |
| $E_2/A_1$ | =10/90 | 493 | 2870 | 445 |
| $E_2/A_2$ | =20/80 | 495 | 2900 | 442 |
| $E_2/A_3$ | =50/50 | 510 | 3000 or more | 426 |
| $E_2/A_4$ | =90/10 | 550 | do. | 451 |
| $E_2/B_1$ | =80/20 | 551 | do. | 438 |
| $E_2/B_1$ | =50/50 | 535 | do. | 412 |
| $E_2/B_3$ | =5/95 | 505 | 2800 | 462 |
| $E_3/A_2$ | =5/95 | 470 | 2710 | 421 |
| | =10/90 | 472 | 2705 | 418 |
| | =50/50 | 486 | 3000 or more | 410 |
| | =80/20 | 498 | do. | 426 |
| | =90/10 | 496 | do. | 420 |
| $E_3/A_3$ | =5/95 | 472 | 2650 | 431 |
| | =15/85 | 480 | 2770 | 427 |
| | =20/80 | 477 | 2760 | 427 |
| | =70/30 | 494 | 3000 or more | 419 |
| $E_3/B_1$ | =20/80 | 470 | do. | 424 |
| | =50/50 | 498 | do. | 422 |
| | =80/20 | 525 | do. | 429 |
| $E_3/B_1$ | =50/50 | 510 | do. | 437 |
| $E_4/A_1$ | =30/70 | 468 | 2800 | 392 |
| | =80/20 | 480 | 3000 or more | 407 |
| $E_4/A_4$ | =50/50 | 484 | do. | 410 |
| $E_4/B_1$ | =80/20 | 508 | do. | 428 |
| $E_4/B_3$ | =50/50 | 500 | do. | 414 |
| $E_5/A_2$ | =10/90 | 490 | 2860 | 422 |
| | =40/60 | 495 | 3000 or more | 420 |
| $E_5/B_2$ | =20/80 | 520 | 2920 | 436 |
| | =40/60 | 540 | 3000 or more | 438 |
| $E_6/A_2$ | =3/97 | 538 | 2470 | 467 |
| | =15/85 | 550 | 2510 | 443 |
| | =50/50 | 561 | 2840 | 438 |
| | =70/30 | 580 | 3000 or more | 450 |
| $E_6/A_4$ | =50/50 | 550 | do. | 436 |
| | =80/20 | 584 | do. | 452 |
| $E_6/B_2$ | =20/80 | 545 | 2500 | 434 |
| | =40/60 | 565 | 2910 | 428 |
| | =60/40 | 569 | 3000 or more | 440 |
| | =95/5 | 580 | do. | 457 |
| $F_1/A_1$ | =10/90 | 505 | do. | 418 |
| | =80/20 | 560 | do. | 433 |
| $F_1/A_2$ | =20/80 | 512 | 2820 | 422 |
| | =90/10 | 564 | 3000 or more | 439 |
| $F_1/A_3$ | =30/70 | 524 | 2860 | 417 |
| | =70/30 | 555 | 3000 or more | 440 |
| $F_1/A_4$ | =50/50 | 530 | do. | 428 |
| $F_2/B_1$ | =20/80 | 534 | do. | 435 |
| | =30/70 | 538 | do. | 430 |
| $F_1/B_2$ | =50/50 | 560 | do. | 442 |
| | =70/30 | 582 | do. | 438 |
| $G_1/A_3$ | =20/80 | 451 | 2790 | 380 |
| | =50/50 | 462 | 3000 or more | 392 |
| | =80/20 | 469 | do. | 408 |
| $G_1/B_1$ | =10/90 | 443 | 2810 | 396 |
| | =30/70 | 450 | 2840 | 373 |
| $G_2/A_1$ | =10/90 | 473 | 2720 | 410 |
| | =40/60 | 490 | 2840 | 404 |
| | =70/30 | 520 | 2960 | 421 |
| $G_2/B_3$ | =10/90 | 494 | 3000 or more | 422 |
| | =40/60 | 530 | do. | 427 |
| | =70/30 | 560 | do. | 438 |

Figure 2:
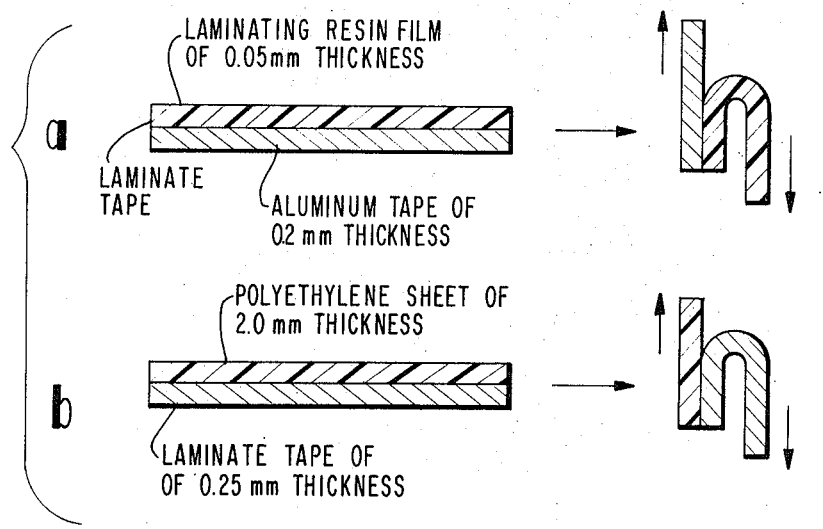
FIG. 2 shows testing methods for determing the adhesive strength of laminate tapes.

*(1) A resin 0.05 mm thick was laminated on an aluminum tape 0.2 mm thick by means of the T-die method where an extruder (cylinder diameter: 50 mm) was used and the resin temperature was 230°C. The adhesive strength was measured, according to the method shown in FIG. 2 (a).
*(2) The laminate tape prepared in *(1) above was put on a polyethylene sheet 2 mm thick via the laminating resin, and they were adhered together at 200°C by applying a pressure of 60 Kg/cm² for 15 minutes. The adhesive strength was measured according to the method shown in FIG. 2 (b).
*(3) The laminated tape was prepared as in *(1) above except that the resin temperature was 260°C. The method of testing the adhesive strength was the same as in *(1) above.
*(4) Equal to the E-S resin of Table 1.
*(5) Ratio of the respective components (percent by weight)

Table 3

| Component | Resin *(5) | Melt Index (g/10 min) | Ratio of Components (wt. %) | | | |
|---|---|---|---|---|---|---|
| single component | P | 7.2 | | | | |
| | S | 3.5 | | | | |
| | E-S | — | | | | |
| second component of mixture | $A_1$ | 11 | ethylene-vinyl acetate copolymer | | | |
| | $A_2$ | 5 | do. | | | |
| | $A_3$ | 2 | do. | | | |
| | $A_4$ | 3 | do. | | | |
| | $B_1$ | 6 | ethylene-ethylacrylate copolymer | | | |
| | $B_2$ | 2 | do. | | | |
| | $B_3$ | 1 | do. | | | |
| | | | EMA*(6) | GA*(7) | AGE*(8) | ethylene |
| single comonent and first component of mixture | $E_1$ | 0.6 | 2.4 | 0 | 0 | balance |
| | $E_2$ | 1 | 12 | 0 | 0 | do. |
| | $E_3$ | 3 | 6.5 | 0 | 0 | do. |
| | $E_4$ | 6 | 6.5 | 0 | 0 | do. |
| | $E_5$ | 9 | 6.5 | 0 | 0 | do. |
| | $E_6$ | 12 | 16 | 0 | 0 | do. |
| | $F_1$ | 14 | 0 | 6.0 | 0 | do. |
| | $G_1$ | 2 | 0 | 0 | 3.5 | do. |
| | $G_2$ | 6 | 0 | 0 | 7.8 | do. |

*(5) ASTMD-1238, temperature 190°C, load 2160 g
*(6) glycidyl methacrylate
glycidyl acrylate
*(8) allyl glycidyl ether From the results of Table 2, it is clear that the laminate tapes prepared using laminating resins of binary copolymers of ethylene-glycidyl acrylate, ethylene-glycidyl methacrylate or ethylene-allyl glycidyl ether have more excellent properties than the convetional laminate tapes. In addition, it also is clear that the use of a mixture of the first component and the second component results in advantageous synergistic effects, i.e., the properties of the mixed compositions are superior to those of the first component alone. In Table 2, various combinations of first components and second components are illustrated. It has also been confirmed that combinations other than those illustrated in Table 2 also have excellent properties.

As shown in Table 2, the binary copolymers of the present invention are excellent in their adhesive strength to the aluminum tape when the laminate tapes are formed by means of an extrusionlaminate method under the laminating conditions of 230°C and 10 m/min.*(1) However, the properties of the laminate tapes of the present invention prepared by means of a high-temperature extrusionlaminate method*(3) where an extruder is used under the extrusionlamination conditions of a temperature of 260°C or more are not so different from those of conventional laminate tapes, and, in particular, the adhesive strength of the high-temperature extrusion laminate tapes is inferior to that of laminate tapes prepared at a temperature of 230°C. Observing the thickness of the laminated resin layer, the inventors found that there was at most a 10 percent thickness fluctuation in tapes prepared by extrusion at 230°C but about a 26 percent thickness fluctuation in those prepared at 260°C.

EXAMPLE 2

The inventors prepared various extrusion-laminate tapes at high extrusion temperatures to try to improve the adhesive strength between the aluminum tape and the resin layer, to increase the lamination speed and to make the thickness of the resin layer uniform, and at last the inventors succeeded in the preparation of such improved laminate tape under high-temperature and high-speed extrusion-lamination conditions.

More precisely, the preparation of the improved laminate tapes was attained by adding 100–10,000 ppm of an antioxidant to the binary copolymers of the present invention or the mixture of the first component and the second component of the present invention as described above. The effective results due to the addition are shown in Table 4. The excellent effects cannot be attained in conventional laminating materials, which is shown in Table 4.

The inventors actually tested the various antioxidants as shown Table 5, and in Table 4 the results with typical antioxidants are shown. In general, any antioxidant in Table 5 has the same effects as given in the Table 4. In addition, the workability of the resins into cable and the blocking property of laminate tape were also tested for the binary copolymers and the mixture compositions thereof of the present invention, each of which contained antioxidant, and it was verified that the properties are good as in the case where the antioxidant is not present.

With respect to the antioxidant content, the heat stability effect can be attained in the resulting tape when antioxidant is present in an amount of 100 ppm or more, and, more preferably, the effect is more remarkable when antioxidant is present in an amount of 300 ppm or more. Related tests were conducted with antioxidant up to 10,000 ppm, and the same effects were confirmed.

However, it has been found that if the content of the antioxidant increases too much, the antioxidant unfavorably migrates to the surface of the tape which is defective. Accordingly, the preferred range of the antioxidant content is 300–5,000 ppm.

Due to the addition of the antioxidant, the lamination speed could be increased and the thickness fluctuation of the resin layer formed decreased to about 10 percent.

TABLE 4

| Resin | Adhesiveness of Resin Containing Antioxidant | | |
|---|---|---|---|
| | Antioxidant | Amount of Antioxidant (ppm) | Adhesive Strength Between Aluminum Tape and Resin (g/cm) Lamination method *(9) |
| P | Antigen WX | 1000 | 55 |
| S | do. | 1000 | 1026 |
| $E_3$ | do. | 100 | 435 |
| do. | do. | 300 | 452 |
| do. | do. | 1000 | 470 |
| do. | do. | 5000 | 463 |
| do. | do. | 10000 | 469 |
| do. | Irganox 1010 | 100 | 437 |
| do. | do. | 300 | 458 |
| do. | do. | 1000 | 469 |
| do. | do. | 5000 | 477 |
| do. | do. | 10000 | 472 |
| $E_5$ | Antigen WX | 100 | 436 |
| do. | do. | 300 | 456 |
| do. | do. | 1000 | 480 |
| do. | do. | 5000 | 487 |
| do. | do. | 10000 | 479 |
| do. | Irganox 1010 | 100 | 429 |
| do. | do. | 300 | 460 |
| do. | do. | 1000 | 479 |
| do. | do. | 5000 | 486 |
| do. | do. | 10000 | 477 |
| $E_3/A_2$=50/50 | Antigen WX | 100 | 439 |
| do. | do. | 300 | 462 |
| do. | do. | 1000 | 489 |
| do. | do. | 5000 | 491 |
| do. | do. | 10000 | 482 |

TABLE 4—Continued

| Resin | Adhesiveness of Resin Containing Antioxidant Antioxidant | Amount of Antioxidant (ppm) | Adhesive Strength Between Aluminum Tape and Resin (g/cm) Lamination method *(9) |
|---|---|---|---|
| do. | Irganox 1010 | 100 | 440 |
| do. | do. | 300 | 458 |
| do. | do. | 1000 | 484 |
| do. | do. | 5000 | 485 |
| do. | do. | 10000 | 483 |
| $E_3/B_2=40/60$ | Antigen WX | 100 | 461 |
| do. | do. | 300 | 498 |
| do. | do. | 1000 | 547 |
| do. | do. | 5000 | 555 |
| do. | do. | 10000 | 550 |
| do. | Irganox 1010 | 100 | 466 |
| do. | do. | 300 | 501 |
| do. | do. | 1000 | 552 |
| do. | do. | 5000 | 548 |
| do. | do. | 10000 | 544 |
| $F_1/A_4=50/50$ | Antigen WX | 100 | 450 |
| do. | do. | 300 | 489 |
| do. | do. | 1000 | 537 |
| do. | do. | 5000 | 543 |
| do. | do. | 10000 | 535 |
| $F_1/A_4=50/50$ | Irganox 1010 | 100 | 457 |
| do. | do. | 300 | 496 |
| do. | do. | 1000 | 549 |
| do. | do. | 5000 | 540 |
| do. | do. | 10000 | 543 |
| $G_2/B_3=40/60$ | Antigen WX | 100 | 448 |
| do. | do. | 300 | 482 |
| do. | do. | 1000 | 529 |
| do. | do. | 5000 | 533 |
| do. | do. | 10000 | 527 |
| do. | Irganox 1010 | 100 | 450 |
| do. | do. | 300 | 491 |
| do. | do. | 1000 | 521 |
| do. | do. | 5000 | 532 |
| do. | do. | 10000 | 528 |

*(9) Extrusion temperature, 260°C; lamination speed 30 m/min.

TABLE 5

| No. | Antioxidant Used Antioxidant Chemical Name | Trade Name |
|---|---|---|
| 1. | 4,4'-thiobis-(6-tert.butyl-3-methylphenol) | Antigen WX |
| 2. | 4,4'-butylidene-bis-(6-tert.butyl-3-cresol) | Samilizer BBM |
| 3. | High molecular weight phenol type | Topanol CA |
| 4. | Mercaptobenzimidazole | Antigen MB |
| 5. | Zinc salt of 2-mercaptobenzothiazole | Soxinol MZ |
| 6. | Selenium diethyl dithiocarbamate | Soxinol SE |
| 7. | Polymer of 2,2,4-trimethyl-1,2-dihydroxyquinoline | Antigen RD |
| 8. | Reaction product of 1,1-bis-(4-hydroxyphenyl)cyclohexane and organic amine | Antigen WA |
| 9. | N,N'-di-beta-naphthyl-p-phenylenediamine | Antigen F |
| 10. | Phenyl-alpha-naphthylamine | Antigen PA |
| 11. | Phenyl-beta-naphthylamine | Antigen D |
| 12. | Triazine derivative | Irganox 565 |
| 13. | Triazine derivative | Irganox 858 |
| 14. | High molecular weight hindered phenol | Irganox 1010 |
| 15. | High molecular weight hindered phenol | Irganox 1076 |

Various laminate tapes were prepared using various kinds of resins (single component) and resin mixtures (of the first component and the second component of this invention), and then laminate sheathed cables were prepared by using the laminate tapes. The properties of the thus prepared laminate sheathed cables are shown in Tables 6 and 7.

The laminate tapes were prepared by a T-die method using an extruder (cylinder diameter: 50 mm) at a resin temperature of 230°C (for resins not containing antioxidant) and at a temperature of 265°C (for resins containing antioxidant).

The thus prepared laminate tapes consist of a soft aluminum tape 0.2 mm thick and a resin layer 0.05 mm thick.

The cable used for this experiment had the structure as shown in FIG. 1 (26 AWG, 100 pairs, aerial cable of 0.4 mm diameter).

The jacket layer of the cable was polyethylene, and the processing temperature was 220°–230°C.

TABLE 6

| Component | Resin | Adhesive Strength Between Aluminum Tape and Polyethylene Jacket (Kg/cm) *(2) | Bending Repetition (up to formation of cracks in the aluminum) *(3) |
|---|---|---|---|
| first component | $E_1$ | 2.76 | 32–36 |
| | $E_2$ | 2.50 | 27–30 |
| | $E_3$ | 2.84 | 30–35 |
| | $E_4$ | 2.52 | 28–33 |
| | $E_5$ | 2.43 | 28–30 |
| | $E_6$ | 2.80 | 29–37 |
| | $F_1$ | 2.50 | 28–31 |
| | $G_1$ | 2.84 | 30–34 |
| | $G_2$ | 2.96 | 31–39 |
| mixture of first component and second component | $E_1/A_1=95/5$ | 3.04 | 30–35 |
| | $E_1/B_1=60/40$ | 3.12 | 34–38 |
| | $E_2/A_1=10/90$ | 2.78 | 29–35 |
| | $E_2/A_3=50/50$ | 3.02 | 31–35 |
| | $E_2/A_1=90/10$ | 3.41 | 40 or more |
| | $E_2/B_1=80/20$ | 3.50 | do. |
| | $E_2/B_3=5/95$ | 2.83 | 29–34 |
| | $E_3/A_2=10/90$ | 2.81 | 30–35 |
| | $E_3/A_2=50/50$ | 2.99 | 34–36 |
| | $E_3/A_2=90/10$ | 3.11 | 31–35 |
| | $E_3/A_3=5/95$ | 2.86 | 30–35 |
| | $E_3/A_3=70/30$ | 3.14 | 35–40 |
| | $E_3/B_1=50/50$ | 3.40 | 40 or more |
| | $E_3/B_1=80/20$ | 3.56 | do. |
| | $E_3/B_2=50/50$ | 3.52 | do. |
| | $E_4/A_1=30/70$ | 2.88 | 29–35 |
| | $E_4/A_1=80/20$ | 3.40 | 40 or more |
| | $E_4/A_1=50/50$ | 3.00 | 30–35 |
| | $E_4/B_1=80/20$ | 3.90 | 40 or more |
| | $E_4/B_3=50/50$ | 3.25 | do. |
| | $E_5/A_2=40/60$ | 2.76 | 26–34 |
| | $E_5/B_2=40/60$ | 3.14 | 33–36 |
| | $E_6/A_2=3/97$ | 2.81 | 30–38 |
| | $E_6/A_2=70/30$ | 3.42 | 40 or more |
| | $E_6/B_2=95/5$ | 3.94 | do. |
| | $F_1/A_1=10/90$ | 2.70 | 29–35 |
| | $F_1/A_2=50/50$ | 2.96 | 32–37 |
| | $F_1/B_1=30/70$ | 2.88 | 35–38 |
| | $G_1/A_3=50/50$ | 3.30 | 40 or more |
| | $G_1/B_1=30/70$ | 3.40 | do. |
| | $G_2/A_1=40/60$ | 3.14 | 30–35 |
| | $G_2/B_3=40/60$ | 3.02 | do. |

*(2), *(3) same as in the Table 1

TABLE 7 (containing antioxidant)

| Resin | Antioxidant | Amount of Antioxidant (ppm) | Adhesive Strength Between Aluminum Tape and Polyethylene Jacket (Kg/cm)*(2) | Bending repetition (up to formation of cracks in the aluminum) *(3) |
|---|---|---|---|---|
| $E_3$ | Irganox 1010 | 1000 | 2.80 | 30–35 |
| $E_3$ | Irganox 1010 | 5000 | 2.87 | 30–35 |
| $E_5$ | Irganox 1010 | 1000 | 2.58 | 28–33 |
| $E_5$ | Irganox 1010 | 5000 | 2.72 | 30–35 |
| $E_3/A_2=50/50$ | Irganox 1010 | 1000 | 2.95 | 33–38 |
| $E_3/A_2=50/50$ | Irganox 1010 | 5000 | 3.10 | 34–36 |
| $F_1/A_4=50/50$ | Irganox 1010 | 1000 | 2.93 | 32–35 |
| $F_1/A_4=50/50$ | Irganox 1010 | 5000 | 3.02 | 34–38 |
| $G_2/B_3=40/60$ | Irganox 1010 | 1000 | 3.10 | 32–37 |
| $G_2/B_3=40/60$ | Irganox 1010 | 5000 | 3.16 | 33–36 |

*(2), *(3) same as in the Table 1

As seen from Tables 6 and 7, the laminate sheathed cables of the present invention prepared using the laminate tapes of the present invention comprising the above described binary copolymer resins or the mixtures thereof have properties which are far superior to the properties of conventional cables as shown in Table 1.

Some various embodiments of the present invention are illustrated in Tables 6 and 7. After many experiments, it was confirmed that the laminate sheathed cables prepared using mixed resin compositions containing 5–95 percent by weight, preferably 5–70 percent by weight, of the second component have the most excellent properties.

While the invention has been described in detail and with reference to specific embodiments thereof, it will be apparent to one skilled in the art that various changes and modifications can be made therein without departing from the spirit and scope thereof.

What is claimed is:

1. A laminate tape composed of a metal tape, said metal tape being characterized in that a copolymer, having a melt index of 16 g/10 min or less measured at 190°C under a load of 2,160 g, of (a) ethylene, and (b) a comonomer selected from the group consisting of glycidyl methacrylate, glycidyl acrylate and allyl-glycidyl ether is used as a resin coated on one or both surfaces of said metal tape.

2. A laminated tape composed of a metal tape, said metal tape being characterized in that a mixed copolymer composition consisting of (a') as a first component, one or more of a copolymer having a melt index of 16 g/min or less measured at 190°C under a load of 2,160 g comprising (a) ethylene and (b) a comonomer selected from the group consisting of glycidyl methacrylate, glycidyl acrylate and allyl-glycidyl ether; and (b') as a second component, one or more of a copolymer comprising (a'') ethylene and (b'') a comonomer selected from the group consisting of an alkyl acrylate, an alkyl methacrylate and vinyl acetate, is coated on one or both surfaces of the metal tape.

3. A laminate tape as claimed in claim 1 wherein an anti-oxidant is added to the copolymer to be laminated on the metal tape in an amount of 100–10,000 ppm, based on the copolymer.

4. A laminate tape as claimed in claim 2 wherein an anti-oxidant is added to the mixed copolymer composition to be laminated on the metal tape in an amount of 100–10,000 ppm, based on the copolymer.

5. A laminate tape as claimed in claim 2 wherein the concentration of the second component is 5–95 percent by weight.

6. A laminate sheathed cable characterized in that a laminate tape composed of a metal tape and a copolymer coated on one or both surfaces of the metal tape, the copolymer having a melt index of 16 g/10 min or less measured at 190°C under a load of 2,160 g and consisting of (a) ethylene and (b) a comonomer selected from the group consisting of glycidyl methacrylate, glycidyl acrylate and allyl-glycidyl ether, is formed on a cable core in the form of a tube and both ends of said tape are united.

7. A laminate sheathed cable characterized in that a laminate tape composed of a metal tape and a mixed resin composition coated on one or both surfaces of the metal tape, the mixed resin composition consisting of (a') as a first component, one or more of a copolymer having a melt index of 16 g/10 min or less measured at 190°C under a load of 2,160 g and consisting of (a) ethylene and (b) a comonomer selected from glycidyl methacrylate, glycidyl acrylate and allyl-glycidyl ether and (b') as a second component, one or more of a copolymer consisting of (a'') ethylene and (b'') a comonomer selected from the group consisting of an alkyl acrylate, an alkyl methacrylate and vinyl acetate, is formed on a cable core in the form of a tube, and both ends of the tape are united.

8. A laminate sheathed cable as claimed in claim 6 wherein an antioxidant is added to the copolymer to be laminated on the metal tape in an amount of 100–10,000 ppm, based on the copolymer.

9. A laminate sheathed cable as claimed in claim 7 wherein an antioxidant is added to the copolymer to mixed copolymer composition to be laminated on the metal tape in an amount of 100–10,000 ppm, based on the copolymer.

10. A laminate sheathed cable as claimed in claim 7 wherein the concentration of the second component is 5–95 percent by weight.

* * * * *